US008819652B2

(12) United States Patent
Zingelewicz et al.

(10) Patent No.: US 8,819,652 B2
(45) Date of Patent: Aug. 26, 2014

(54) SYSTEM AND METHOD FOR PARAMETRIC SYSTEM EVALUATION

(75) Inventors: Stephen Eric Zingelewicz, Scotia, NY (US); Branden James Moore, Latham, NY (US)

(73) Assignee: General Electric Company, Niskayuna, NY (US)

( * ) Notice: Subject to any disclaimer, the term of this patent is extended or adjusted under 35 U.S.C. 154(b) by 356 days.

(21) Appl. No.: 12/846,930

(22) Filed: Jul. 30, 2010

(65) Prior Publication Data

US 2012/0030656 A1 Feb. 2, 2012

(51) Int. Cl.
*G06F 9/45* (2006.01)
*G06F 9/44* (2006.01)

(52) U.S. Cl.
USPC .......................... 717/151; 717/135; 717/154

(58) Field of Classification Search
None
See application file for complete search history.

(56) References Cited

U.S. PATENT DOCUMENTS

| | | | |
|---|---|---|---|
| 6,145,121 A * | 11/2000 | Levy et al. ..................... | 717/135 |
| 7,275,242 B2 * | 9/2007 | Liu et al. ....................... | 717/154 |
| 7,370,295 B1 * | 5/2008 | Chesal et al. ................. | 716/133 |
| 7,539,957 B1 | 5/2009 | Nagarandal | |
| 7,680,782 B2 | 3/2010 | Chen et al. | |
| 7,685,471 B2 | 3/2010 | Rajan et al. | |
| 7,752,606 B2 * | 7/2010 | Savage ........................... | 717/135 |
| 7,895,585 B2 * | 2/2011 | Prakash et al. ................. | 717/131 |
| 7,908,593 B2 * | 3/2011 | Arnold et al. .................. | 717/131 |
| 7,921,418 B2 * | 4/2011 | Nair et al. ...................... | 717/151 |
| 7,979,852 B2 * | 7/2011 | Bodin et al. ................... | 717/154 |
| 8,112,743 B2 * | 2/2012 | Defour et al. .................. | 717/135 |
| 2004/0205718 A1 * | 10/2004 | Reynders ....................... | 717/124 |
| 2006/0047794 A1 * | 3/2006 | Jezierski ........................ | 709/221 |
| 2006/0101440 A1 * | 5/2006 | Stay et al. ...................... | 717/151 |
| 2007/0011668 A1 * | 1/2007 | Wholey et al. ................. | 717/151 |
| 2007/0061784 A1 * | 3/2007 | Prakash et al. ................. | 717/127 |
| 2007/0162902 A1 * | 7/2007 | Pozzi et al. .................... | 717/154 |
| 2007/0179917 A1 * | 8/2007 | Patel et al. ..................... | 706/13 |
| 2008/0115120 A1 * | 5/2008 | Clifton et al. ................. | 717/153 |

OTHER PUBLICATIONS

Triantafyllis et al. Compiler Optimization-space exploration. International Symposium on Code Generation and Optimization, Mar. 2003, pp. 204-215, Retrieved on [Apr. 17, 2014] Retrieved from the Internet: URL <http://ieeexplore.ieee.org/xpls/abs_all.jsp?arnumber=1191546&tag=1>.*

Qasem et al., "Automatic Tuning of Whole Applications Using Direct Search and a Performance-based Transformation System", The Journal of Supercomputing, vol. 36, No. 2, pp. 183-196, May 2006.

(Continued)

*Primary Examiner* — Thuy Dao
*Assistant Examiner* — Cheneca Smith
(74) *Attorney, Agent, or Firm* — Melissa K. Dobson

(57) ABSTRACT

A method and system for evaluating a system are described. A parameter space comprising one or more parameters corresponding to the system and/or an application executed on the system is defined. Additionally, one or more search functions for selecting a parameter from the parameter space to evaluate a desired characteristic of the system are determined. Further, at least one parameter from the parameter space is selected using the one or more search functions and the application is executed using the selected parameter. Subsequently, the execution of the application is monitored and metrics associated with the application are recorded. The method further includes iteratively selecting another parameter from the parameter space based on the recorded metrics and executing the application using the selected another parameter.

16 Claims, 4 Drawing Sheets

(56) References Cited

OTHER PUBLICATIONS

Grigori Fursin et al; "Milepost GCC: machine learning based research compiler"; Author manuscript, published in "GCC Summit, Ottawa : Canada (2008)"; 13Pages.

Jamie Hillman et al; "An Open Framework for Dynamic Reconfiguration"; Proceedings of the 26th International Conference on Software Engineering (ICSE'04)02705257/04 $20.00 © 2004 IEEE; 10Pages.

* cited by examiner

SYSTEM AND METHOD FOR PARAMETRIC SYSTEM EVALUATION

BACKGROUND

Embodiments of the present system and technique relate generally to automated systems, and more particularly to an automated tool for parametric system evaluation.

Continuing innovation in science and industry requires ever-increasing computing resources while placing strict requirements on system performance, size, response, reliability, portability, power consumption and design time. Particularly, evolution of present day systems towards complex heterogeneous multi-chip systems involves a great deal of design, test and optimization time. Moreover, the software code used for operating these systems is difficult to understand and verify by traditional means. Furthermore, applications running on these systems include millions of lines of software code corresponding to intricate interactions that defy simple description or brute-force investigation. A guided, deterministic approach to evaluating the software code and associated system parameters, therefore, generally relies on human testers to envision every possible combination of actions. Such a manually guided approach, however, is an unrealistic proposition given the level of software complexity in present-day applications.

Accordingly, dynamic evaluation and reconfiguration techniques have been proposed to provide adaptive change management systems that shift the burden of processes such as system configuration, maintenance and fault management from people to technology. Most dynamic evaluation techniques, however, are ad hoc approaches that tend to be system specific and have limited applicability. Certain other evaluation techniques, however, may include their own run-time characteristics and applicability constraints for reconfiguring a system while preserving system integrity. By way of example, a recently proposed solution teaches the use of a compiler employing machine learning techniques to customize an application for a given computer architecture. Specifically, the compiler customizes the application with the aim to optimize system performance and/or minimize compiled code size. Such a compiler, however, may not alter the given source code for optimizing system performance, and therefore, may provide only limited applicability restricted to a compiler optimization level.

Further, such conventional change management systems conform to the black-box philosophy by encapsulating a fixed and/or a predefined set of reconfiguration algorithms. Moreover, only a few change management systems provide a clear measure of costs associated with reconfiguring the system, especially when using a large parameter space. Generally, costs may be measured in terms of the time taken for reconfiguration and the degree of disruption experienced by the system when using a particular algorithm to manage a particular change scenario. In absence of such quantifiable cost data, developers are unable to ascertain an impact of reconfiguring the system using the particular algorithm on system parameters such as availability, response-time, and throughput. Additionally, conventional change management systems do not provide a means for comparing different reconfiguration algorithms.

It is therefore desirable to develop an effective system and method for parametric system evaluation. Particularly, there is a need for a reconfigurable system that includes system-independent change-management capabilities for adapting to all possible requirements and design constraints based on the evaluation. Additionally, it may be desirable to develop a system that uses the evaluation results to optimize applications having large parameter spaces and varying program and system behavior with low overhead.

BRIEF DESCRIPTION

In accordance with aspects of the present technique, a computerized method for optimizing a system is described. The method includes defining a parameter space comprising one or more parameters corresponding to the system, an application executed on the system, or a combination thereof. Additionally, one or more search functions for selecting a parameter from the parameter space to evaluate a desired characteristic of the system are determined. Further, at least one parameter from the parameter space is selected using the one or more search functions and the application is executed using the selected parameter. Subsequently, the execution of the application is monitored and metrics associated with the application are recorded. The method further includes iteratively selecting another parameter from the parameter space based on the recorded metrics and executing the application using the selected another parameter.

In accordance with aspects of the present system, an automated evaluation system is presented. The system includes an input/output interface that receives a parameter space. The parameter space may include one or more parameters corresponding to an application and one or more search functions for selecting a parameter from the parameter space for evaluating a characteristic corresponding to the system. To that end, the system includes an iteration controller communicatively coupled to the input/output interface for iteratively selecting a parameter from the parameter space using the one or more search functions. Additionally, the system also includes an iteration processor communicatively coupled to the iteration controller for executing the application using the selected parameter. The iteration processor further monitors the execution of the application to determine metrics associated with the desired system characteristic. The iteration processor then configures the iteration controller to update the one or more search functions for iteratively selecting the parameter from the parameter space for executing the application. Particularly, the iteration processor configures the iteration controller to update the one or more search functions based on the determined metrics associated with the desired system characteristic. Further, the iteration processor directs the iteration controller to iteratively select another parameter from the parameter space using the one or more updated search functions and executes the application using the selected another parameter.

DRAWINGS

These and other features, aspects, and advantages of the present technique will become better understood when the following detailed description is read with reference to the accompanying drawings in which like characters represent like parts throughout the drawings, wherein.

DETAILED DESCRIPTION

The following description presents systems and methods for parametric evaluation of a system and/or applications running on the system. Particularly, certain embodiments illustrated herein describe an automated system for parametrically evaluating desired system and/or application characteristics. By way of example, the desired system and/or application characteristics include system performance, reliability, portability, power consumption, design time, execution time, compilation time, code size, number of input/output (I/O) operations, memory usage, total thread count, and so on. In accordance with aspects of the present technique, the automated system allows a user to evaluate the desired system and/or application characteristics by specifying a parameter space and one or more search functions that iterate over the parameter space to select an appropriate parameter for creating and executing the final application.

Particularly, in one embodiment, the system compiles and executes the application using the selected parameters and records the results. The system continues selecting new parameters or parameter combinations, and compiling and executing the new parameters/parameter combinations until the parameter space is exhausted or until certain optimal conditions are met. The optimal conditions may correspond to a desired range of values corresponding to the desired system characteristics such as execution time, application code size, a total thread count and so on. The system further evaluates the results of the different execution cycles to select optimal metrics for the application to be used for the final compilation and the final application. As used herein the term "optimal metrics" refer to a range of output values indicative of the optimal condition of the desired system characteristics.

Although the present systems are described with reference to image processing, the claimed system may be used in many different operating environments for evaluating a variety of applications and system components. By way of example, the present system may be used to evaluate and optimize desired characteristics of compilers, system processes, user-defined applications, and so on. An exemplary environment suitable for practicing various implementations of the present system is described in the following sections with reference to FIG. 1.

Figure 1:
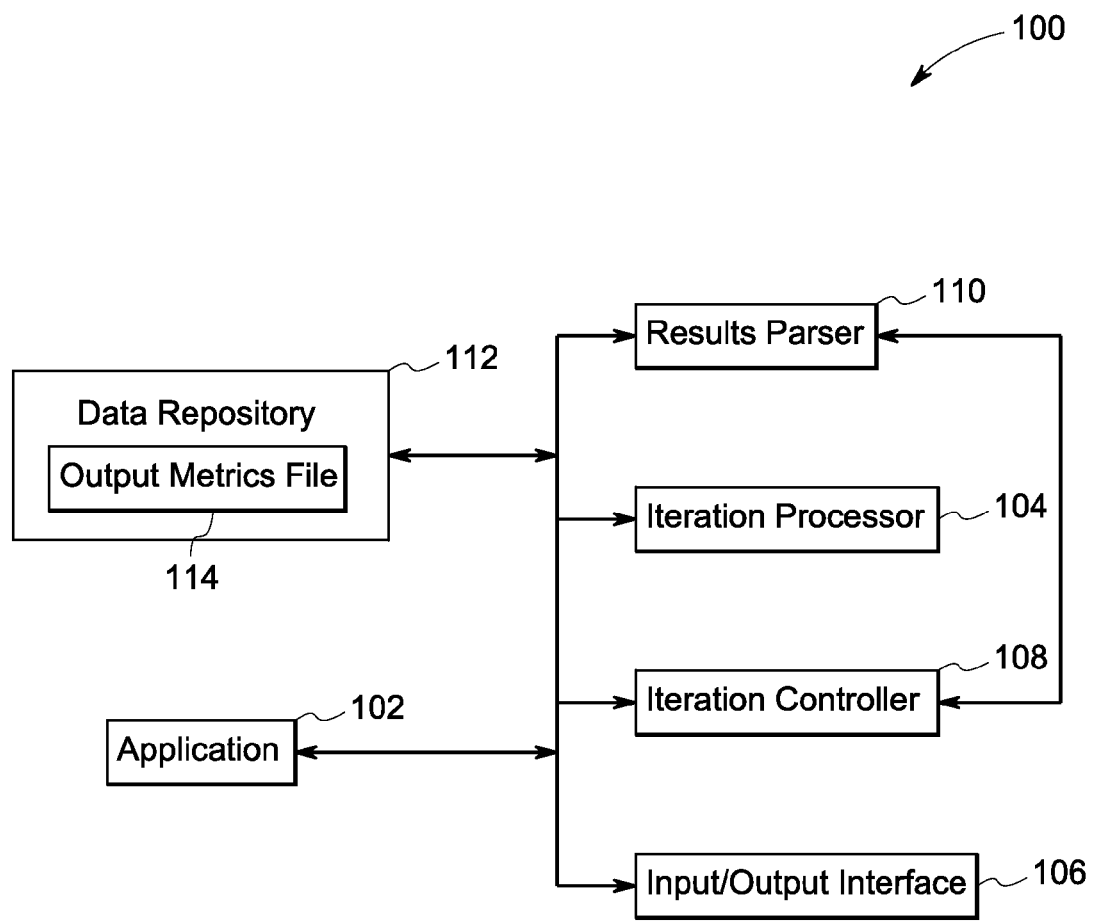
FIG. 1 is a block diagram of an exemplary system for parametric evaluation, in accordance with aspects of the present system.

FIG. 1 illustrates an exemplary evaluation system 100 for parametrically evaluating one or more desired characteristics corresponding to the system 100 and/or an application 102. In one embodiment, the system 100 includes a general-purpose computing system that may further include, for example, processors such as a general-purpose processor (GPP), field programmable gate array (FPGA), application specific integrated circuit (ASIC), or other accelerators such as graphics processing units (GPUs). As used herein, the application 102 refers to an entire application or one or more modules within the application. The application 102 in one example corresponds to an image processing application executing on the system 100. To that end, the system 100 includes an iteration processor 104 for preparing and executing the application 102, and parsing the execution results to determine metrics corresponding to the desired system characteristics. In the present embodiment, one of the desired system characteristics may correspond to a blocking strategy that may be used by the application 102 for efficiently processing images of varying sizes, such as from 128×128 up to 8192×8192.

In accordance with aspects of the present technique, the system 100 enables a user to evaluate the desired system characteristics by defining a parameter space. As used herein, the term "parameter space" corresponds to a collection of parameters that may be used individually or in combination with the other parameters in the collection to execute the application 102. By way of example, the parameters in the parameter space corresponding to the application 102 may include a size of an image to be processed, a partition size of the image including particular numbers of rows and columns in the partition, and so on. Generally, if a particular task in the application 102 may be performed using a plurality of parameters and/or means, the parameter space may be defined to include the plurality of parameters and/or means, one or more which may be employed in any given execution cycle. The application 102, therefore, may be programmed to receive selectable parameters that may be turned on or turned off, for example, by preprocessor definitions at compile time or through conditional execution at runtime.

Accordingly, in one embodiment, the system 100 includes an I/O interface 106 for enabling the user to define and/or customize the parameter space including a set of all possible configurations of parameters corresponding to the application 102. To that end, the I/O interface 106 may include a custom graphical user interface (GUI) having pull-down and/or selectable menus for allowing the user to select and/or add one or more parameters to the parameter space that may be used to execute the application 102. Particularly, in certain embodiments, the custom I/O interface 106 may be programmed in a programming language such as Python to allow the user to programmatically define the parameter space by selecting and/or customizing one or more parameters for executing the application 102.

Additionally, the user may also define a creation command for preparing the application 102 for execution and/or reconfiguration. By way of example, the creation command may prepare the application 102 for execution by invoking a compiler to create a binary representation of a source code corresponding to the application 102, configuring a set of parameterized compiler flags and/or configuring data files to be read in by the application 102 at run time.

The system 100, thus allows the user to define the creation command in addition to the collection of all or a certain subset of parameters, desired bounds of the parameter space, and one or more desired parameter combinations for executing the application 102. In certain embodiments, however, the system 100 may include a semi-automated mechanism for processing the application 102. Once the user defines the parameter space and one or more search functions to iterate over the parameter space, the semi-automated mechanism allows the system 100 to automatically create, execute, monitor, and clean the application 102 for each selected parameter or parameter combination. The semi-automated mechanism, however, may return control to the user after a desired number of execution cycles to customize the one or more search functions based on the execution outputs. Alternatively, the system 100 may incorporate a fully automated processing mechanism that automatically defines a parameter space using a pre-defined set of parameters, parameter ranges and search functions for executing related aspects of the application 102.

The parameter space, however, is generally combinatorial, thereby requiring testing of an extremely large number of parameter combinations for evaluating the desired system characteristics. The system 100, therefore, includes an iteration controller 108 for determining one or more relevant parameters that meet certain criteria, thereby reducing the total number of parameter combinations employed for executing the application 102. By way of example, the iteration controller 108 may select particular numbers of rows and columns corresponding to a partition of an image under processing as the relevant parameters.

Accordingly, the iteration controller 108 provides the user with one or more search functions for selecting an appropriate parameter or parameter combination for executing the application 102 to evaluate desired system characteristics. By way of example, the iteration controller 108 may provide the user with the one or more search functions for selecting an appropriate partition size including particular numbers of rows and columns for evaluating an execution time of the application 102. Generally, the one or more search functions correspond to one or more techniques that may be employed by the iteration controller 108 to iteratively search the parameter space for selecting the appropriate parameter according to certain desired criteria.

By way of example, the desired criteria employed by the iteration controller 108 may include a size of a processor's cache into which a selected partition should fit and/or an allowable number of partition elements that can be processed by the iteration processor 104. In certain embodiments, the iteration controller 108 may further allow the user to define a new search function and/or customize the one or more search functions for interactively selecting an appropriate parameter or parameter combination based on user preferences and/or application requirements. In certain other embodiments, however, the iteration controller 108 may receive the user preferences and/or application requirements for selecting the appropriate parameter from the user via the I/O interface 106.

Subsequently, the iteration processor 104 executes the application 102 or a module of the application 102 using the selected parameter. In one embodiment, the user may define an execution command for customizing execution parameters corresponding to the application 102 based on user preferences and/or application requirements. To that end, the execution command includes one or more parameters such as command line arguments and/or environment variables for directing the iteration processor 104 to invoke and execute the application 102 in a specified manner.

The iteration processor 104 further monitors the execution of the application 102 using selected parameters or parameter combinations to determine metrics associated with the desired system characteristics. By way of example, the iteration processor 104 monitors the execution of the application 102 using selected partition sizes such as those including the same number of rows and columns, a greater number of columns than rows and/or a greater number of rows than columns. Further, the iteration processor 104 determines metrics associated with desired system characteristics for each selected partition size. As previously noted, the desired system characteristics may include execution time, compilation time, code size, number of I/O operations, memory usage, total thread count, and so on. Particularly, the iteration processor 104 determines and records the metrics associated with the desired system characteristics from an output generated upon executing the application 102 using each selected partition size.

In accordance with aspects of the present technique, the system 100 further includes a results parser 110 for allowing the user to specify which portions of the generated output may be displayed using the I/O interface 106. Particularly, the results parser 110 allows the user to select only desired portions of the generated output relevant to the evaluation of the desired system characteristics, while selectively ignoring irrelevant portions of the generated output. In one embodiment, the generated output may be displayed as an HTML report summarizing values of the desired system characteristics as achieved by using the selected parameter. By way of example, the user may employ the results parser 110 to selectively display portions of the generated output related to memory usage and/or execution time of the application 102 when using different partition sizes. Displaying selected portions of the generated output allows the user to evaluate an effect of employing a particular partition size on the memory usage and/or the execution time of the application 102.

The results parser 110, thus, provides the user with insight into advantageous yet unintuitive design requirements that are difficult to identify, debug, or change when deployed into a real-time application. Further, the user may customize the one or more search functions for selecting an appropriate parameter that may substantially achieve the desired system characteristics based on the insights gathered from the generated output. In certain embodiments, the system 100 further includes a data repository 112 for storing the generated output in an output metrics file 114. Additionally, the iteration processor 104 tags the metrics stored in the output metrics file 114 determined from a plurality of execution cycles with the selected parameters that were used to build the application 102. Optionally, the iteration processor 104 communicates the determined metrics and relevant tags to the iteration controller 108.

In accordance with aspects of the present technique, the iteration controller 108 uses the metrics determined from previous execution cycles to update the one or more search functions for selecting an appropriate parameter that may substantially optimize the desired system characteristics. The determined metrics, for example, may indicate a shorter execution time and/or better memory utilization by the application 102 when using a partition size that includes a greater number of columns than rows. Accordingly, the iteration controller 108 may update the one or more search functions to include desired criteria that allow selection of partition sizes that include a greater number of columns than rows to optimize the desired system characteristics. The one or more updated functions, therefore may select only those partition sizes that favor processing of two column elements (x and x+1) located in adjacent memory locations rather than two row elements (y and y+1) that are located far apart in the memory. Thus, the one or more search functions may generally be updated to perform a heuristic search by restricting the search space to only those parameters that substantially affect the desired system characteristics and/or adhere to certain desired criteria.

Further, in one embodiment, the iteration processor 104 may optionally employ a user-defined clean command for returning the execution environment of the application 102 to a known state. Subsequently, the iteration processor 104 queries the iteration controller 108 for iteratively selecting another parameter from the parameter space based on the updated search functions. Specifically, the iteration processor 104 queries the iteration controller 108 for selecting another parameter until all of the desired parameters in the parameter space are exhausted. Alternatively, the iteration processor 104 queries the iteration controller 108 for selecting another parameter until all of the desired parameters in the parameter space that match desired criteria are exhausted. The iteration processor 104, in certain other embodiments, may continually query the iteration controller 108 for selecting another parameter according to some user-definable limits. The limits include, for example, a determined number of queries or tries and/or a range of output parameter values indicative of desirable or acceptable system performance.

Additionally, in one embodiment, the iteration processor 104 may further evaluate the results of the different execution cycles to determine optimal metrics for the application 102. The iteration processor 104 then communicates the optimal metrics and the corresponding parameters to the iteration controller 108. The iteration controller 108 uses the optimal parameters received from the iteration processor 104 for the final compilation and final execution of the application 102. As used herein the term "optimal parameters" refer to the set of parameters that when used for executing the application 102 achieve a desired range of output metrics corresponding to the desired system characteristics. By way of example, in on implementation a set of parameters that achieve an execution time of less than 1 second may be considered as the optimal parameters for the application 102. Particularly, the iteration controller 108 reconfigures the application 102 using the optimal parameters before the final compilation. The application source code, thus reconfigured, is then integrated with other software components in the application 102 before compilation.

The system 100, thus, employs previous outputs to quickly converge on the most optimal parameters even in large parameter spaces with substantially low overhead. Unlike conventional systems that employ machine learning techniques embedded in the compiler to optimize compiled code, the system 100 evaluates and reconfigures the source code of the application 102 to optimize the desired system characteristics. Particularly, the reconfigurable iteration controller 108 enables the system 100 to robustly adapt to all possible application requirements and design constraints before compilation. Moreover, unlike conventional change management systems, the system 100 provides a measure of the effect of employing a particular parameter for executing the application 102. Additionally, the system 100 enables comparison of different reconfiguration functions, thereby enabling the user to appropriately configure the system 100 for selecting the most appropriate parameter for evaluating and optimizing the desired system characteristics.

Figure 2:
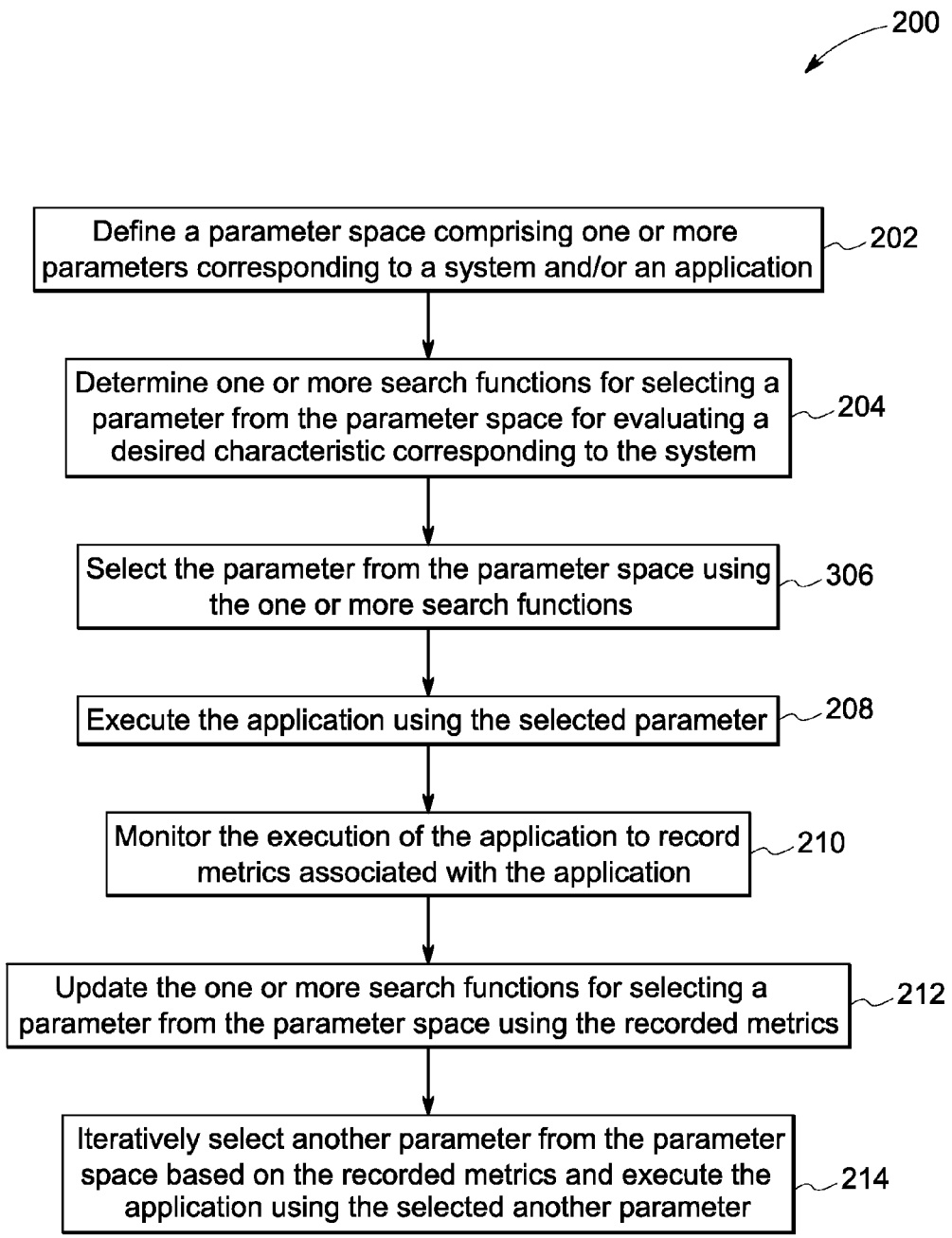
FIG. 2 is a flow chart illustrating an exemplary method for parametric system evaluation, in accordance with aspects of the present technique.

Further, FIG. 2 describes a method for evaluating a system based on one or more parameters and substantially optimizing the desired characteristics of the system based on the parametric evaluation results. Specifically, in FIG. 2, a flow chart 200 depicts an exemplary method for parametrically evaluating a system described in a general context of computer executable instructions. Generally, computer executable instructions may include routines, programs, objects, components, data structures, procedures, modules, functions, and the like that operate on a computing resource to perform particular functions or implement particular abstract data types. The exemplary method may also be practiced in a distributed computing environment where optimization functions are performed by remote processing devices that are linked through a communication network. In the distributed computing environment, the computer executable instructions may be located in both local and remote computer storage media, including memory storage devices.

Further, in FIG. 2, the exemplary method is illustrated as a collection of blocks in a logical flow graph, which represents a sequence of operations that may be implemented in hardware, software, or combinations thereof. The various operations are depicted in blocks to illustrate functions that are performed during defining a parameter space, monitoring the application, updating the search functions and other phases of the exemplary method. In the context of software, the blocks represent computer instructions that, when executed by one or more processing subsystems, perform the recited monitoring operations. The order in which the exemplary method is described is not intended to be construed as a limitation, and any number of the described blocks may be combined in any order to implement the exemplary method disclosed herein, or an equivalent alternative method. Additionally, individual blocks may be deleted from the exemplary method without departing from the spirit and scope of the subject matter described herein. For discussion purposes, the exemplary method is described with reference to the implementations of FIG. 1.

The exemplary method aims to parametrically evaluate an image processing system and quickly converge on the most optimal parameters even in large parameter spaces with substantially low overhead. To that end, at step 202, a user defines a parameter space for evaluating one or more desired characteristics of the image processing system. By way of example, the desired system characteristics may correspond to execution time, compilation time, code size, number of I/O operations, memory usage, a total thread count, and so on. The user, therefore, may define a collection of some or all parameters, parameter combinations and desired bounds of the parameter space for selecting an appropriate parameter that may substantially optimize the desired system characteristics.

The parameter space, however, is generally combinatorial, thereby requiring testing of an extremely large number of parameter combinations for evaluating the desired system characteristics. Many of these parameter combinations may be particularly advantageous for system evaluation, yet be unintuitive to a user. The image processing system, therefore, includes a configurable iteration controller such as the iteration controller 108 of FIG. 1 for determining the relevant and non-obvious parameters from the parameter space that meet certain desired criteria.

Accordingly, at step 204, the iteration controller determines one or more search functions for selecting an appropriate parameter from the parameter space relevant to the evaluation of the desired system characteristics. Generally, the one or more search functions correspond to one or more techniques that may be employed by the iteration controller to navigate or search the parameter space for selecting the appropriate parameter according to certain desired criteria. To that end, the iteration controller may include one or more pre-defined search functions and/or allow the user to re-define, customize and/or add to the one or more pre-defined search functions for selecting an appropriate parameter. In one embodiment, the one or more search functions allow the iteration controller to heuristically search the parameter space for parameters that fulfill the desired criteria. By way of example, if the application requires a selected parameter to have a value less than a determined limit, such as a size of a processor's cache, the iteration controller may employ a function that includes a check for verifying the parameter value before selection.

In the present embodiment, the image processing system, by default, may perform a full combinatorial search on the parameter space for selecting the appropriate parameter for evaluating the desired system characteristics at step 206. Alternatively, at step 206, the iteration controller employs the one or more search functions for selecting an appropriate parameter from the parameter space, thereby reducing the total number of parameter combinations employed for executing the image processing application. Further, the iteration controller communicates the selected parameter to the iteration processor for executing the application.

Subsequently, at step 208, the iteration processor executes the application using the selected parameter or parameter sets. To that end, the user may define an execution command for customizing the execution parameters corresponding to the application. Particularly, the execution command may include runtime parameters such as command line options and/or environment variables for directing the iteration processor to invoke and execute the application in a specified manner.

Further, at step 210, the iteration processor monitors the execution of the application to determine metrics associated with the desired system characteristics. Specifically, the iteration processor determines the metrics from an output generated upon executing the application using the selected parameter. In one embodiment, the image processing system may further include a results parser for allowing the user to specify one or more portions of the generated output to be recorded. Particularly, the results parser allows the user to select desired portions of the generated output relevant to the evaluation of the desired system characteristics, while selectively ignoring irrelevant portions of the generated output. In certain embodiments, the results parser records selected portions of the generated output as a customized report summarizing values of the desired system characteristics achieved by using the selected parameter.

The results parser, thus, may provide the user with insight into the system's performance and/or other metrics at several hundred data points. Some of these data points may be particularly advantageous for system evaluation, yet be non-obvious to a user. The user, therefore, may employ the iteration controller to heuristically search the non-obvious parameter combinations to find new performance points. Particularly, the iteration controller may use the one or more search functions to implement the heuristic search to select a parameter without expert guidance or knowing intricate details of executing the image processing system. The iteration processor may then use the selected parameter or parameter combination to execute the application and record relevant results.

In certain embodiments, the iteration processor communicates the recorded metrics to the iteration controller. Accordingly, at step 212, the iteration controller may use the metrics determined from previous execution cycles to update the one or more search functions for selecting an appropriate parameter that substantially optimizes the desired system characteristics. By way of example, if the desired system characteristics of a multi-core system correspond to system performance and execution time, the iteration controller 108 may update the one or more search functions to select the parameters that leverage the system's parallel processing capability. Moreover, once the application is executed, the iteration processor may optionally employ a user-defined clean command for returning the execution environment of the application to a known state.

Subsequently, at step 214, the iteration processor queries the iteration controller for iteratively selecting another parameter from the parameter space for executing the application based on the updated search functions. Specifically, the iteration processor queries the iteration controller for selecting another parameter until all of the desired parameters in the parameter space are exhausted. Alternatively, the iteration processor queries the iteration controller for selecting another parameter until all of the desired parameters in the parameter space that match the desired criteria are exhausted or until a determined limit is met. By way of example, the limit may correspond to a determined number of queries or tries and/or a range of output parameter values indicative of desirable or acceptable system performance.

Additionally, in one embodiment, the iteration processor evaluates the results of the different execution cycles to determine optimal metrics for the application. The iteration processor then communicates the optimal metrics and the corresponding parameters to the iteration controller. The iteration controller uses the optimal parameters received from the iteration processor for the final compilation and final execution of the application. Particularly, the iteration controller reconfigures the application using the optimal parameters. The application source code, thus reconfigured, is then integrated with other software components in the application before compilation. As the source code is reconfigured before compilation, developers have greater flexibility to modify application behavior to achieve substantially optimal values of desired system characteristics.

The iteration controller, thus, employs previous execution outputs to quickly converge on the most optimal parameters even in large parameter spaces with substantially low overhead. Additionally, the reconfigurable iteration controller enables the system to robustly adapt to all possible application requirements and design constraints. Particularly, in one aspect, the processing involves analyzing the metrics of the parameters for an optimal condition and compiling a final application based on the parameters for the optimal condition. An exemplary implementation of such an automated system for parametric evaluation will be described in greater detail with reference to FIG. 3.

Figure 3:
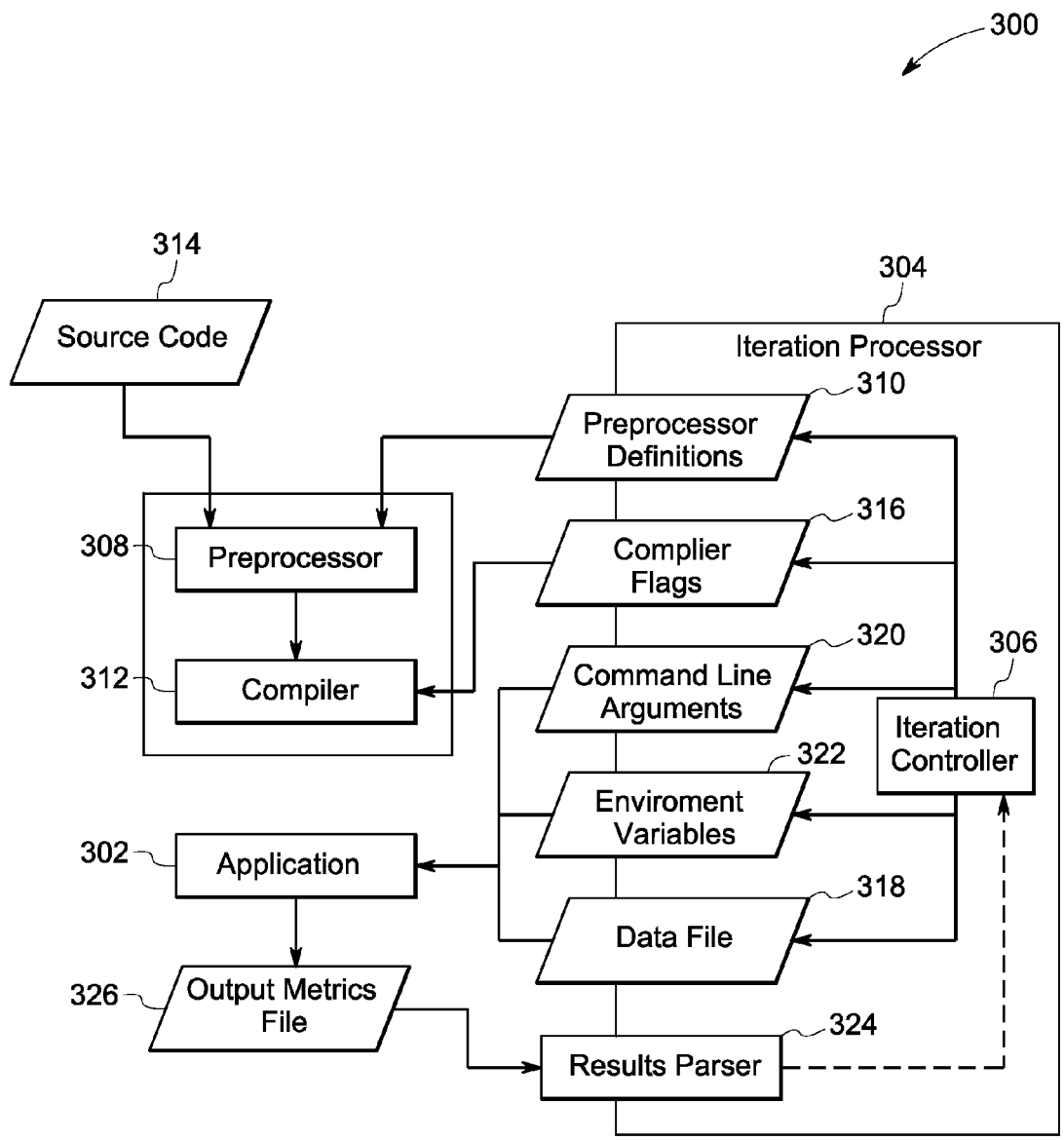
FIG. 3 is a block diagram illustrating exemplary operations of an iteration processor for implementing the exemplary method described with reference to FIG. 2.

FIG. 3 is a block diagrammatic illustration depicting an exemplary image processing system 300 similar to the system 100 of FIG. 1 for implementing the exemplary method described with reference to FIG. 2. For purposes of demonstrating an imaging application, the present embodiment describes evaluation of the exemplary image processing system 300 that is executing a Sobel image filter application 302.

Figure 4:
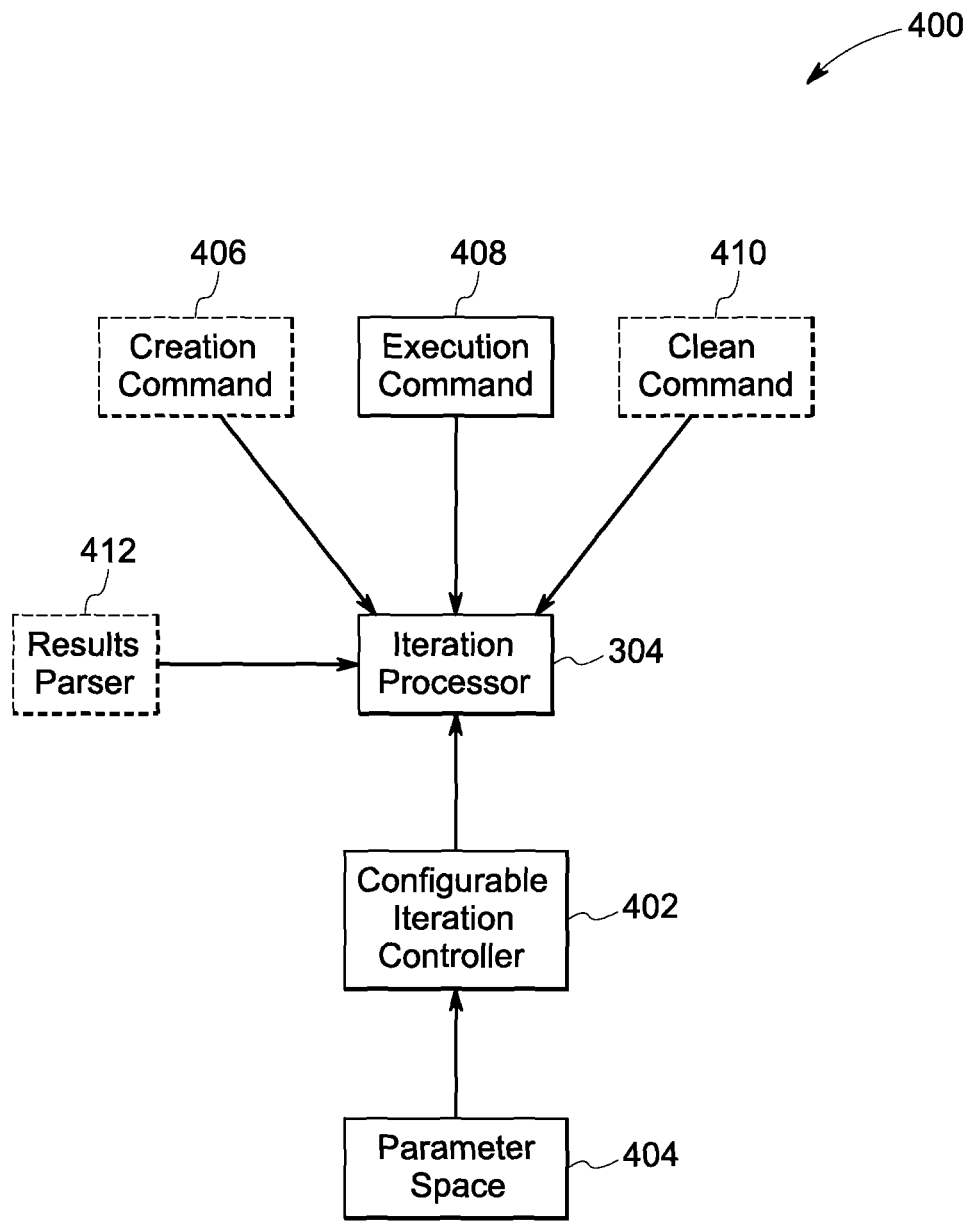
FIG. 4 is a block diagram depicting exemplary dependencies corresponding to the iteration processor illustrated in FIG. 3.

Accordingly, the image processing system 300 includes an iteration processor 304 for preparing and executing the image filter application 302, and parsing the execution results to determine metrics corresponding to the desired system characteristics. To that end, FIG. 4 illustrates a block diagram 400 depicting one or more exemplary inputs and/or dependencies corresponding to the iteration processor 304. Particularly, as depicted in FIG. 4, the iteration processor 304 may receive the parameter selected by the configurable iteration controller 402 from the parameter space 404 for executing the image filter application 302. Further, the iteration processor 304 may optionally receive a user-defined creation command 406, an execution command 408 and a clean command 410 for preparing and executing the image filter application 302. Additionally, the iteration processor 304 may also receive customized output from the results parser 412 and parse the received output for evaluating the desired characteristics of the image processing system 300.

Referring again to FIG. 3, the iteration processor 304 employs the one or more dependencies illustrated in FIG. 4 for evaluating the desired system characteristics. In the present embodiment, one of the desired characteristics corresponding to the image filter application 302 may include an efficient blocking strategy that may be used by the image filter application 302 for efficiently processing images of varying sizes, such as from 128×128 up to 8192×8192.

In accordance with aspects of the present technique, the image processing system 300 enables a user to evaluate the desired system characteristics by defining a parameter space. As previously noted, the term "parameter space" corresponds to a collection of all parameters that may be used individually or in combination with the other parameters in the collection to execute the image filter application 302. Particularly, the user defines the collection of all parameters, desired bounds of the parameter space, and one or more desired combination of parameters for executing the image filter application 302.

In certain embodiments, the image processing system 300 may include a custom graphical user interface (not shown) having pull-down and/or selectable menus for allowing the user to select and/or add one or more parameters to the parameter space. Particularly, in certain embodiments, the custom interface may be programmed in a programming language such as Python to programmatically define the parameter space by selecting one or more parameters for executing the image filter application 102. The parameter space, however, is generally combinatorial, thereby requiring testing of an extremely large number of parameter combinations for evaluating the desired system characteristics. The image processing system 300 therefore includes an iteration controller 306 for selecting one or more relevant parameters from the parameter space for executing the image filter application 302.

By way of example, the parameter space may include a plurality of partitions including varied numbers of rows and columns of the image that may be processed together during each image processing cycle. To that end, the image processing system 300, in one embodiment, may include a preprocessor 308 for implementing the number of rows and columns of the image as C preprocessor definitions 310, thereby controlling the parameter definitions 312 before compilation.

Further, in certain embodiments, the parameter space may be stored in a data repository (not shown) coupled to the image processing system 300 as a dictionary including mappings between the preprocessor definitions 310 and acceptable parameter values. By way of example, the parameter space may be stored in the dictionary as mappings between the preprocessor definitions 310 and acceptable image row and column numbers. Particularly, the iteration controller 306 may use the preprocessor definitions 310 and related mappings to vary the numbers of the rows and columns of the image for selecting a substantially optimal blocking strategy from the defined parameter space. Moreover, as the values of the preprocessor definitions 310 are known at compile time, a resultant executable can gain the benefit of any further optimizations performed by an associated compiler 312.

Accordingly, the iteration controller 306 provides the user with one or more search functions that may use the preprocessor definitions 310 for interactively selecting an appropriate parameter or parameter combination for evaluating the desired system characteristics. In one embodiment, the iteration controller 306 may select a parameter from the parameter space based on a default function that employs a full combinatorial search of the parameter space. Alternatively, in certain other embodiments, the iteration controller 306 allows the user to define a new function and/or customize the one or more search functions for interactively selecting an appropriate parameter or parameter combinations based on user preferences and/or application requirements.

Furthermore, the user may optionally define a creation command for preparing the image filter application 302 for execution using the selected parameter. By way of example, the user-defined creation command may prepare the image filter application 302 for execution by invoking a compiler 312 to create a binary application from a source code 314 corresponding to the image filter application 302. Alternatively, the user-defined creation command may configure a set of parameterized compiler flags 316 and/or data files 318 to be read in by the image filter application 302 at run time. The iteration controller 306 may use the parameterized compiler flags 316, command line arguments 320, environment variables 322, and/or the data files 318 to update the one or more search functions for selecting the relevant parameters.

Particularly, the iteration controller 306 employs the updated search functions to select only those parameters that meet certain criteria affecting the desired characteristics of the image processing system 300. By way of example, if the image filter application 302 requires the value corresponding to a selected parameter combination to be below a determined limit, such as a size of a processor's cache, the iteration controller 306 may employ the one or more customized functions to include a check on the value of the parameter combination before selection. The iteration controller 306, thus, restricts the total number of selected parameter combinations employed for executing the image filter application 302, thereby facilitating faster evaluation and optimization of the desired system characteristics.

Subsequently, the iteration processor 304 executes the image filter application 302 using the selected parameter or parameter combination. In one embodiment, the user may define an execution command for customizing the execution parameters corresponding to the image filter application 302 based on user preferences and/or application requirements. To that end, the execution command includes runtime parameters such as command line arguments 320 and/or environment variables 322 for directing the iteration processor 304 to invoke and execute the image filter application 302 in a specified manner.

The iteration processor 304 further monitors the execution of the image filter application 302 to determine metrics associated with the desired system characteristics. As previously noted, the desired system characteristics include execution time, compilation time, code size, number of I/O operations, memory usage, total thread count, and so on. Specifically, the iteration processor 304 determines and/or records the metrics associated with the desired system characteristics from an application output generated upon executing the image filter application 302 using the selected parameter. In certain embodiments, the iteration processor 304 may display the generated output using the custom interface. Displaying the generated output allows the user to evaluate an effect of employing the selected parameter for executing the image filter application 302 on the desired system characteristics.

In accordance with aspects of the present technique, the image processing system 300 further includes a results parser 324 for allowing the user to specify which portions of the generated output may be collected using the custom interface. Particularly, the results parser 324 allows the user to select only desired portions of the generated output relevant to the evaluation of the desired system characteristics, while selectively ignoring irrelevant portions of the generated output. The results parser 324, thus, allows the user to evaluate the effect of the selected parameter on the desired system characteristics, thereby providing the user with insight into the system's performance and/or other metrics at several advantageous yet unintuitive data points.

In certain embodiments, the image processing system 300 may store the output displayed by the results parser 324 in an output metrics file 326. Particularly, the iteration processor 304 tags the metrics stored in the output metrics file 326 determined from a plurality of execution cycles with the selected parameters that were used to build the image filter application 302. Optionally, the iteration processor 304 communicates the determined metrics and relevant tags to the iteration controller 306. In one embodiment, the iteration controller 306 uses the metrics determined from previous execution cycles to update the one or more search functions for selecting an appropriate parameter that substantially optimizes the desired system characteristics. By way of example, if the metrics determined from previous executions indicate improved memory usage and faster execution time by using parameters that favor processing in the X coordinate direction as compared to a Y coordinate direction, the iteration controller 306 may update the one or more search functions to select parameters that allow processing in an X coordinate direction.

Further, in one embodiment, the iteration processor 304 may employ a user-defined clean command for returning the execution environment of the image filter application 302 to a known state. Subsequently, the iteration processor 304 queries the iteration controller 306 for iteratively selecting another parameter from the parameter space for executing the image filter application 302. Specifically, the iteration processor 304 queries the iteration controller 306 for selecting another parameter until all of the desired parameters in the parameter space are exhausted. Alternatively, the iteration processor 304 queries the iteration controller 306 for selecting another parameter until all of the desired parameters in the parameter space that match the desired criteria are exhausted or until certain user-defined limits are met. Once the iteration controller 306 finds an appropriate parameter to reconfigure the image filter application 302, the reconfigured source code is integrated with other software components in the image filter application 302.

The automated evaluation systems and methods disclosed hereinabove, thus, employ previous execution outputs to quickly converge on the most optimal parameters even in large parameter spaces with substantially low overhead. By way of example, the metrics determined from the Sobel image filter application 302 may show that the peak performance is achieved by using blocks of many columns, yet few rows. Comparing the determined metrics corresponding to a specific image size with metrics corresponding to other image sizes processed during different execution cycles provides sufficient information to the iteration controller 306 to converge on to an effective peak blocking strategy applicable to almost all image sizes.

Thus, the reconfigurable iteration controller enables the system to robustly adapt to all possible application requirements and design constraints. Moreover, unlike conventional change management systems, the system provides a measure of the effect of employing a particular parameter for executing the application. Additionally, the system enables comparison of different reconfiguration functions, thereby enabling the user to appropriately configure the system for selecting the most appropriate parameter for evaluating the desired system characteristics. The automated evaluation system, thus, provides the user with an insight into advantageous design specifications that optimize the desired system characteristics before compilation.

Although the exemplary embodiments in the present technique are described in the context of image processing, use of the disclosed technique for evaluating and optimizing desired characteristics of other systems and applications such as compilers, system processes, user-defined applications is also contemplated.

Furthermore, the foregoing examples, demonstrations, and process steps such as those that may be performed by the iteration processor (104, 304) and iteration controller (108, 306) may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to Python, C++ or Java. Such code may be stored or adapted for storage on one or more tangible, machine readable media, such as on data repository chips, local or remote hard disks, optical disks (that is, CDs or DVDs), or other media, which may be accessed by a processor-based system to execute the stored code.

While only certain features of the present invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computerized method for optimizing a system, comprising:
    defining a parameter space comprising one or more parameters corresponding to the system, an application executed on the system, or a combination thereof;
    determining one or more search functions to select a parameter from the parameter space or to select a parameter combination for evaluating a desired characteristic of the system;
    selecting at least one parameter or parameter combination from the parameter space using the one or more search functions which are defined as selected parameters;
    reconfiguring source code corresponding to the application to generate reconfigured source code before compilation of the source code into executable code so as to receive the selected parameter or the selected parameter combination and the one or more search functions;
    invoking a creation command for preparing the application for execution using the selected parameter or the selected parameter combination, wherein invoking the creation command comprises creating a binary representation of the reconfigured source code;
    invoking an execution command that controls execution of the binary representation of the reconfigured source code by selectively configuring one or more parameterized compiler flags, command line arguments, environment variables, data files to be read in by the application at run time, or combinations thereof, and executing the application using the selected parameter;
    monitoring the execution of the application and recording metrics associated with the application, wherein the application is programmed to receive the selected parameters, each of the selected parameters turned on or turned off by preprocessor definitions at compile time or through conditional execution at runtime such that the preprocessor definitions feedback into a preprocessor prior to compilation of the reconfigured source code; and
    updating the one or more search functions for iteratively selecting another parameter or another parameter combination from the parameter space that improves the desired characteristic of the system based on the recorded metrics and executing the application using the selected another parameter or selected another parameter combination.

2. The computerized method of claim 1, wherein defining the parameter space comprises identifying the one or more parameters for evaluating the desired system characteristic using configurable macros, preprocessor definitions, compiler flags, command line arguments, environment variables, data files, or combinations thereof.

3. The computerized method of claim 1, further comprising outputting the recorded metrics associated with the desired system characteristic, storing the recorded metrics associated with the desired system characteristic, or a combination thereof.

4. The computerized method of claim 3, further comprising analyzing the recorded metrics for an optimal condition and compiling a final application.

5. The computerized method of claim 1, further comprising updating the one or more search functions for iteratively selecting another parameter from the parameter space before compilation of the programming code based on the recorded metrics.

6. The computerized method of claim 1, wherein iteratively selecting another parameter from the parameter space comprises invoking a clean command for preparing the application for execution using the selected another parameter.

7. The computerized method of claim 6, wherein invoking the clean command comprises restoring an execution environment of the application to a known state.

8. The computerized method of claim 1, further comprising iteratively selecting another parameter and executing the application using the selected another parameter until the desired system characteristic is achieved.

9. The computerized method of claim 1, wherein the desired system characteristic comprises one or more of application execution time, memory usage, system performance, system reliability, system portability, power consumption, application compilation time, application code size, number of input/output operations and a total thread count.

10. An automated evaluation system, comprising:
an input/output interface that receives a parameter space comprising one or more parameters corresponding to an application and one or more search functions for selecting a parameter or a parameter combination from the parameter space for evaluating a characteristic corresponding to the system;
an iteration controller stored in memory communicatively coupled to the input/output interface, wherein the iteration controller iteratively selects a parameter or parameter combination from the parameter space using the one or more search functions; and
an iteration processor communicatively coupled to the iteration controller, wherein the iteration processor:
reconfigures source code corresponding to the application to generate reconfigured source code before compilation of the source code into executable code so as to receive the selected parameter or the selected parameter combination and the one or more search functions;
invokes a creation command for preparing the application for execution using the selected parameter or the selected parameter combination, wherein invoking the creation command comprises creating a binary representation of the reconfigured source code;
invokes an execution command that controls execution of the binary representation of the reconfigured source code by selectively configuring one or more parameterized compiler flags, command line arguments, environment variables, data files to be read in by the application at run time, or combinations thereof, and executes the application using the selected parameter or the selected parameter combination;
monitors the execution of the application to determine metrics associated with the desired system characteristic;
configures the iteration controller to update the one or more search functions for iteratively selecting the parameter or the parameter combination from the parameter space for executing the application that improves the desired characteristic of the system based on the determined metrics associated with the desired system characteristic;
directs the iteration controller to iteratively select another parameter or another parameter combination from the parameter space using the one or more updated search functions; and
executes the application using the selected another parameter or the selected another parameter combination;
wherein the application is programmed to receive the selected parameters, each of the selected parameters turned on or turned off by preprocessor definitions at compile time or through conditional execution at runtime such that the preprocessor definitions feedback into a preprocessor prior to compilation of the reconfigured source code.

11. The automated evaluation system of claim 10, further comprising a pre-processor that prepares the application to receive the one or more parameters corresponding to the application and the one or more search functions.

12. The automated evaluation system of claim 10, wherein the iteration controller iteratively selects the parameter from the parameter space for evaluating the desired system characteristic until each of the one or more parameters corresponding to the parameter space has been used to execute the application.

13. The automated evaluation system of claim 10, wherein the iteration processor iteratively selects another parameter from the parameter space and the iteration controller executes the application using the selected another parameter until the desired system characteristic is achieved.

14. The automated evaluation system of claim 10, further comprising a results parser that outputs the determined metrics associated with the desired system characteristic in a desired form.

15. The automated evaluation system of claim 10, wherein the iteration controller updates the one or more search functions before compilation of the application based on the determined metrics associated with the desired system characteristic.

16. The automated evaluation system of claim 10, further comprising a data repository that stores the determined metrics associated with the desired system characteristic, the one or more parameters, the selected parameter, the desired system characteristic, or combinations thereof.

* * * * *